United States Patent [19]
Working et al.

[11] Patent Number: 6,001,263
[45] Date of Patent: Dec. 14, 1999

[54] DISTILLER'S DRIED GRAIN AS OIL DISPERSANT

[75] Inventors: Gordon E. Working; Lori C. Moffatt, both of Missoula; Richard C. Potter, Seeley Lake, all of Mont.

[73] Assignee: Nurture Inc., Missoula, Mont.

[21] Appl. No.: 09/209,056

[22] Filed: Dec. 9, 1998

Related U.S. Application Data

[63] Continuation of application No. 09/046,211, Mar. 23, 1998, abandoned, which is a continuation of application No. 08/847,927, Apr. 28, 1997, abandoned, which is a continuation of application No. 08/377,199, Jan. 24, 1995, abandoned.

[51] Int. Cl.$^6$ ....................................................... C02F 1/28
[52] U.S. Cl. ........................................... 210/691; 210/924
[58] Field of Search ..................... 210/671, 680, 210/691, 749, 924, 925

[56] References Cited

U.S. PATENT DOCUMENTS

| | | | |
|---|---|---|---|
| 3,394,119 | 7/1968 | Luce et al. | 260/112 |
| 3,609,096 | 9/1971 | Salomone | 252/352 |
| 3,676,357 | 7/1972 | Ciuti et al. | 502/402 |
| 3,714,063 | 1/1973 | Salomone | 252/312 |
| 3,793,218 | 2/1974 | Canevari | 252/312 |
| 3,843,517 | 10/1974 | McKinney et al. | 210/11 |
| 3,900,421 | 8/1975 | Fusey | 252/312 |
| 4,098,694 | 7/1978 | Perlaky | 525/312 |
| 4,110,213 | 8/1978 | Tennant et al. | 252/312 |
| 4,224,152 | 9/1980 | Lepain | 210/729 |
| 4,248,733 | 2/1981 | States, Sr. | 252/355 |
| 4,382,873 | 5/1983 | Gatellier et al. | 252/312 |
| 4,462,910 | 7/1984 | Lepain et al. | 210/610 |
| 4,469,603 | 9/1984 | Lepain et al. | 210/749 |
| 4,483,716 | 11/1984 | Heller | 134/7 |
| 4,560,482 | 12/1985 | Canevari | 210/749 |
| 4,597,893 | 7/1986 | Byford et al. | 252/354 |
| 4,623,468 | 11/1986 | Lepain et al. | 210/749 |
| 4,764,285 | 8/1988 | Robbins et al. | 210/749 |
| 4,830,759 | 5/1989 | Charlier | 210/749 |
| 4,978,459 | 12/1990 | Bock et al. | 210/749 |
| 5,051,192 | 9/1991 | Charlier | 210/749 |
| 5,082,563 | 1/1992 | Webb et al. | 210/631 |
| 5,112,495 | 5/1992 | Bartha et al. | 210/691 |
| 5,399,350 | 3/1995 | Potter | 424/418 |

FOREIGN PATENT DOCUMENTS

| | | |
|---|---|---|
| 740217 | 3/1970 | Belgium . |
| 197608 | 8/1976 | Japan . |

OTHER PUBLICATIONS

H.I. Fuller, *The Use of Floating Absorbents and Gelling Techniques for Combating Oil Spills on Water*, Journal Of The Institute Of Petroleum, 57(553) 35–43 (1971).

*Primary Examiner*—Ivars Cintins
*Attorney, Agent, or Firm*—Knobb, Martens, Olson & Bear, LLP

[57] ABSTRACT

A method and composition for dispersing oil. Distiller's dried grain is applied to an oil spill or to an animal or object contacted with oil. The distiller's dried grain sorbs and disperses the oil, allowing dispersal of the oil in open water or removal of the oil from the animal or object.

7 Claims, No Drawings

DISTILLER'S DRIED GRAIN AS OIL DISPERSANT

RELATED APPLICATIONS

This application is a continuation of U.S. patent application Ser. No. 09/046,211, filed Mar. 23, 1998, which is a continuation of U.S. patent application Ser. No. 08/847,927, filed Apr. 28, 1997, which is a file wrapper continuation of U.S. patent application Ser. No. 08/377,199, filed Jan. 24, 1995, all now abandoned.

FIELD OF THE INVENTION

The present invention is related to the use of natural grain material as an oil dispersant. More specifically, the invention relates to the use of distiller's dried grain as a dispersant of oil spills and as an agent for cleaning surfaces contaminated with oil.

BACKGROUND

When an oil spill occurs, the most desirable remedy is recovery of the spilled oil. However, rarely is more than 10% of the oil released in a major spill ultimately recovered. Oil that cannot be recovered may be dispersed, thus protecting shorelines, preventing the oiling of marine birds and mammals, and speeding oil biodegradation. Oil dispersal has not been universally satisfactory, however, mainly due to the high toxicity of currently available dispersants.

Many dispersants are surfactant-based. However, there is reason to believe that the efficacy of such dispersants is directly correlated with their toxicity. A surfactant at a concentration sufficient to emulsify petroleum may also be expected to have deleterious effects on marine organisms. Such effects include tissue irritation, changes in gill membrane permeability that promote asphyxiation and an increase in the uptake of chemical pollutants.

Commercially available oil dispersants are all liquids and possess relatively low $LD_{50}$s (high toxicity). These include COREXIT® 9527 (Exxon), a surfactant-solvent product for oil dispersal; NAXCHEM® Dispersant K (formerly known as Conco Dispersant K and now sold by Ruetgers-Nease), a product consisting primarily of surfactants and alcohols; ATLANT'OL® AT-7 (Aspra, Inc.), a water-based product; OMNI-CLEAN® OSD (Delta Omega Technologies), a water-based product containing synthetic surfactants and fatty acid soaps and marketed as a safe, low-toxicity product; COREXIT® 9550 (Exxon); and COREXIT® 7664 (Exxon), a product formerly marketed as an open-sea dispersant but now sold mostly as a beach cleaner.

Surfactants added to oil slicks on water tend to be immediately diluted by the water. Only when sufficient surfactant concentration is in contact with both water and oil will dispersal occur. Once the surfactant has solubilized the oil, the dispersed droplets mix with greater and greater quantities of water. While this is the desired effect of dispersal, it also tends to further dilute the surfactant concentration, so that resurfacing of oil slicks may occur.

Related U.S. application Ser. No. 08/027,861, now U.S. Pat. No. 5,399,350, discloses the use of a substantially intact proteinaceous particulate material derived from grains as an oil emulsifier and high efficiency dispersant. Exemplified materials typically have been milled, solvent extracted, and separated from other components of grains. While this material has excellent dispersal properties, it is somewhat expensive for widespread use. Moreover, it is produced by an exacting process that requires careful process control and dedicated production equipment. As a result, the worldwide production capacity is currently insufficient to permit large scale use on major oil spills.

Thus, there is a need for a lower cost, readily available, natural non-toxic material useful as an oil dispersant that is available in large quantities. The present invention provides such a material and a method for using it in remediation of environmental spills.

SUMMARY OF THE INVENTION

The raw material for most commercial ethanol production is cereal crops, such as wheat and corn. The spent, dried grains recovered after alcohol fermentation, termed distiller's dried grain (DDG; also known as dried distiller's grain or distiller's spent grain) or distiller's dried grain with soluble material recycled back (DDGS) are largely a waste material with few commercial uses. We have now discovered that DDG and DDGS materials are effective as oil spill dispersants. This particulate material, which is essentially insoluble, in contrast to liquid dispersants, is not subject to the emulsion-breaking effects of dilution after dispersal occurs. Similarly, because of this particulate nature, the dispersant of the present invention can be used without suffering deleterious dilution effects during or after dispersal. It has the major advantages of the grain-based oil spill dispersants previously disclosed, and is available at much lower cost and in much higher quantities.

One embodiment of the present invention is an oil dispersant composition, comprising DDG. According to one aspect of this embodiment, the DDG is formed into a solid mass having air or other gas entrained therein in sufficient quantities that the composition will float on water. Advantageously, the grain is fermentable. Preferably, the grain is oats, wheat, corn, barley, rice or rye; most preferably, the grain is corn. In addition, the composition may include solubles added back to the DDG. The DDG composition is advantageously ground in an attrition mill prior to application. Preferably, the DDG including solubles is a (–)50 U.S. mesh fraction. According to another aspect of this embodiment, the DDG composition is formed through foaming the DDG with a blowing agent during pelletization or extrusion. Advantageously, the DDG is extruded or pelletized with a binder. Preferably, the binder is a long chain fatty acid, fatty acid ester or metal salt thereof. Examples of such binders include, but are not limited to, stearic acid, calcium stearate and zinc stearate. The DDG composition may be coated with a material that is insoluble in water but soluble in oil. The DDG may also be mixed with an active culture of a bacterium that biodegrades oil. The oil is preferably crude petroleum oil or a refined petroleum product.

The present invention also includes a method for facilitating cleanup of environmental oil, comprising the step of applying DDG to the environmental oil and permitting the oil to become sorbed to the DDG. Advantageously, the oil is on a surface and the DDG is applied to the surface. Preferably, the surface is an animal body. In another aspect of this embodiment, the oil is floating on an open body of water. The oil may be either crude petroleum oil or a refined petroleum product. The DDG is preferably in a floating, porous form. Further, the DDG may be allowed to sorb the oil and then the DDG carrying the sorbed oil may be dispersed in the water.

Another embodiment of the present invention is a method for remediating hydrocarbons in contaminated soil, comprising admixing DDG or DDGS and the soil, whereby the DDG or DDGS binds to the hydrocarbons. The hydrocarbons may be aliphatic, aromatic or a mixture thereof. Preferably, the DDG or DDGS is admixed with the soil by plowing. The method may further comprise the addition of petroleum-degrading bacteria to the soil. Preferably, the hydrocarbons and the DDG are present in a ratio of between about 100:1 and about 0.1:1; most preferably, the ratio is between about 10:1 and about 1:1.

DETAILED DESCRIPTION OF THE INVENTION

DDG and DDGS are commercially available from a number of sources, including Alcotech, Ringling, Mont. These are essentially waste material by-products remaining after the fermentation of grain during alcohol production. This material is natural, non-toxic, biodegradable, readily available and extremely inexpensive. In fact, the dried DDG was sold by Alcotech as animal feed at an approximate price in 1994 of $ 0.07 USD per pound. DDG may be obtained after the fermentation of a number of grains, including corn, wheat, barley, oats, rice and rye, although the use of DDG derived from any grain as an oil dispersant is within the scope of the present invention. DDG or DDGS may be used intact as large macroscopic particulates, or may advantageously be ground in an attrition mill such as a hammer mill or pin mill or may be processed, chopped, or otherwise comminuted in a conventional manner to produce material having smaller particle sizes. Median particle size may be determined by milling parameters, by using a series of graduated sieves or by particle size analysis. Furthermore, in applications requiring more exacting control over the particle sizes, more advanced particle sizing apparatus and methods are available to those of skill in the art.

As used herein, U.S. mesh size refers to the number of openings between sieve wires per linear inch. The "(-)" designation before the mesh size (i.e. (-)50 mesh) refers to the material which has passed through the mesh. U.S. mesh sizes are conventional in the art and correspond to specific particle sizes produced upon passing a material through the mesh.

The particulate materials of the present invention are capable of being used in conjunction with the cleanup and/or control of spills or release of unwanted or dangerous agents into the environment, including the cleanup and control of crude oil spills or refined petroleum product spills in open water; cleanup of other lipophilic or oily materials on open water; and cleanup of similar materials from solid surfaces, such as rocks, beaches, floors, soils, and living creatures such as birds and mammals.

The particulate materials may be introduced to an area of oil released upon a body of water. Thereafter, the DDG sorbs the oil, dispersing it so that it is more easily assimilated into the environment. This method of providing a colloidal dispersion of oil is particularly efficacious, since microbial degradation of the oil can more easily occur. Oil degrading bacteria may also be combined with the DDG compositions of the present invention to promote removal of the oil during and after dispersion. Such bacteria are well known in the art and are commercially available.

DDG can absorb a wide variety of substances, including hydrophobic materials such as oils. When placed on an oil slick, the DDG first absorbs oil, forming an in situ emulsifiable concentrate. Subsequent wave, wind, and current action without further human interaction will create an emulsion that acts to disperse the oil into the water column. Thus, DDG offers an alternative solution to the problem of dispersing spilled oil. Moreover, it does so without adding large amounts of toxic materials to the oceans. In fact, DDG is derived from an edible cereal grain product and as such is harmless to marine animals.

It will be appreciated that the DDG may either be administered as a powder to the surface of the water containing the oil, or may be formed into readily-dispersible solid forms, such as foams, tablets, agglomerates, granules or pellets (a convenient mode of storage and application). Principally, however, whatever mode of administration is chosen, it is preferred that the DDG be prepared in a buoyant form so that it will float freely upon the upper layer of oil. This will facilitate maximum contact between the DDG and the oil. To achieve these objectives, a variety of well-known production techniques can be used including lyophilization, forming of pellets containing a blowing agent (e.g., carbon dioxide), followed by dissipation of the blowing agent with resulting formation of a foamed, low-density solid; and binding the DDG with a variety of binders, fillers, or excipients. Preferred binders include long-chain fatty acids, fatty acid esters or metal salts thereof such as, for example, magnesium stearate. Typically, it is preferred that binders be used in concentrations ranging from about 0.1 to 0.5 parts binder to one part DDG.

In order to permit the DDG to preferentially absorb oil instead of water, it may be coated with an oil-soluble, water-insoluble coating, such as a wax. Techniques such as molding and extrusion can be used to form foamed or non-foamed DDG into macroscopic shapes.

The amount of DDG applied to the oil spill will vary with the amount of oil to be removed. Generally, the DDG can remove from about 30% to about 90% of the oil with which it comes in contact. One may attempt to disperse most of the oil or only a small portion of it. Typically, 1–5 grams of oil can be dispersed by 1 gram of DDG. This can serve as a guideline to those of skill in the art in selecting the desired amount of DDG to apply to any particular spill.

In addition to dispersion of oil on open water, the dispersants of the present invention may be used to clean marine birds and mammals soiled by petroleum products. The DDG will sorb the oil, allowing its removal by rinsing with water. The DDG may also be applied to beaches and rocks to sorb and remove spilled lipophilic contaminants such as petroleum or petroleum products.

In addition, the DDG or DDGS may be used to remediate contaminating hydrocarbons from soil. These materials, when admixed with contaminated soil, will bind to and immobilize the hydrocarbon compounds, resulting in their accelerated degradation by promoting the growth of oil-degrading bacteria which occur naturally in the soil. This accelerated degradation is due, in part, to the high nutrient content of the DDG. An inoculum of petroleum-degrading bacteria may also be added to the soil to further promote hydrocarbon breakdown. Because the hydrocarbons bind to DDG which is insoluble, the migration of the hydrocarbons is essentially precluded while microbial degradation is occurring.

The hydrocarbons may be either aliphatic, aromatic or a mixture thereof. In a preferred embodiment, between about 0.01 parts and about 1 part of DDG is admixed with 100 parts of soil contaminated with hydrocarbons. In a preferred embodiment, the ratio of hydrocarbons to DDG (w/w) is between about 100:1 and about 0.1:1. In a particularly preferred embodiment, the ratio is between about 10:1 and about 1:1.

Although the preferred method of admixing the DDG and the contaminated soil is by plowing, any method capable of resulting in admixture of the DDG and the soil is within the scope of the invention. These materials offer distinct advantages over fertilizers which are water-soluble and would thus enter the water table. The dispersants of the present invention are not water soluble and would thus not lead to ground water contamination by the hydrocarbons bound thereto.

Further details, objects and advantages of the present invention will be apparent through a review of the following examples.

EXAMPLE 1

PREPARATION OF SYNTHETIC SEAWATER

Synthetic seawater for use in experiments of the present invention was prepared in the following manner:

| Ingredient | Concentration (g/L) |
| --- | --- |
| NaCl | 17.10 |
| $MgCl_2 \cdot 6 H_2O$ | 7.73 |
| $Na_2SO_4$ | 2.85 |
| $CaCl_2 \cdot 2 H_2O$ | 1.06 |
| KCl | 0.48 |
| $NaHCO_3$ | 0.14 |

Following dissolution of all ingredients, the solution is adjusted to pH 8.0±0.1 with concentrated hydrochloric acid or sodium hydroxide. As will be appreciated, this formulation is identical to the Environmental Protection Agency's (the "EPA") regimen. See 40 CFR, Part 300, Subpart J.

EXAMPLE 2

PROTOCOL FOR TESTING OIL DISPERSION PROPERTIES OF DDG

In order to test the oil dispersion and emulsification properties of DDG and DDGS, we devised a protocol that combines features of the EPA's standard method and the Labofina (rotating flask) method.

In general, a two-liter beaker containing 1 L of synthetic seawater (prepared in accordance with Example 1) is placed in a Model G76 orbital shaker (New Brunswick Scientific, Edison, N.J.).

Standard curves for test oils are obtained as follows: Approximately 0.07 g of oil is added to a 10.0 ml volumetric flask, which is then filled to the mark with chloroform. Dilutions are made with the following concentrations of oil: 3500, 1750, 875, 350, 175, and 87.5 mg/L. Absorbance at 620 nm is measured for all solutions, as well as for a chloroform blank, and a standard curve for the oil is calculated by the method of least squares.

Oil (1.0 g) is added dropwise to the water. The dispersing agent is then sprinkled onto the oil slick. The shaker is started immediately and run at approximately 140 rpm, or about 50% of full scale. This speed was chosen because it appears to yield the most realistic wave action in the beaker without causing spillage. The shaker is stopped after 60 minutes and a grab sample (ca. 50 ml) is taken from 4–5 cm below the water surface using a large dropper. Exactly 25.0 ml of this sample is pipetted into a separatory funnel containing 25.0 ml of chloroform, and the pipet is rinsed by drawing the chloroform into it and ejecting it back into the funnel. The funnel is then stoppered and shaken for 60 seconds. The water and chloroform layers are allowed to separate, and the chloroform layer is drawn off and filtered through anhydrous sodium sulfate. A sample of the chloroform layer is taken and its absorbance is read at 620 nm. The concentration of the oil in the chloroform (and therefore in the water sample) is calculated from a standard curve. Percent efficiency is defined as:

$$\% \text{ Eff.} = \frac{(\text{mg oil}/\text{L calculated from absorbance})}{(\text{mg oil originally added to 1 L water})} \times 100\%$$

We have found that one gram is the optimum amount of test oil to use. If larger amounts of oil are used, so that the water:oil ratio falls below about 1000, the percent efficiency begins to fall off; the dispersal process appears to be water-limited under those conditions. If the quantity of oil is less than 1 g, the amount of oil lost by adhesion to the inner surface of the beaker above the water line becomes significant.

The oil dispersant properties of corn DDG and DDGS were determined as described below.

EXAMPLE 3

Oil dispersant properties of corn DDG and DDGS

Approximately 272 g of corn DDGS and 130 g corn DDG were obtained from Alcotech, Ringling, Mont. 0.200 g DDG was applied to 1.01 g North Slope (NS) crude oil obtained from Shell Oil, Anacortes, Wash., in one liter of seawater and shaken according to the protocol of Example 2 for 1 hour at room temperature. The DDG was pin milled to a median particle size of about 125 $\mu$m (120 U.S. mesh) and 0.200 g of the pin milled material was applied to 1.00 g NS crude oil in one liter of seawater and shaken for 1, 2, 19.5, 24, 48 and 72 hours.

DDGS (100.2 g) was ground in a food processor and passed through a 50 U.S. mesh sieve (297 $\mu$m), since it did not grind well in a pin mill due to its high oil content. The yield was 4.6 g of the (–)50 U.S. mesh material. 0.200 g was applied to 1.00 g NS crude oil in 1 liter of seawater and shaken for 19 hours.

The absorbance values at 620 nm were measured at these time points and are indicated in Table 1. These materials performed well in dispersant tests and did not agglomerate.

TABLE 1

| Sample | $OD_{620}$ | % efficiency |
| --- | --- | --- |
| DDG-1 h | 0.059 | 39.4 |
| DDG-Pin Mill-1 h | 0.093 | 63.5 |
| DDG-Pin Mill-2 h | 0.080 | 54.4 |
| DDG-Pin Mill-19.5 h | 0.072 | 48.9 |
| DDG-Pin Mill-24 h | 0.094 | 64.2 |
| DDG-Pin Mill-48 h | 0.123 | 84.4 |
| DDG-Pin Mill-72 h | 0.128 | 87.9 |
| (–) 50 mesh DDGS | 0.061 | 41.2 |

EXAMPLE 4

Oil Dispersant Properties of Wheat DDG

Wheat DDG (Alcotech) was pin milled twice in a Kitchen Mill (K-Tec, Orem, Utah) to a (–)120 U.S. mesh particle size (125 $\mu$m) and 0.200 g was applied to 1.04 g NS crude oil in 1 liter of sea water and shaken for 1 hour 20 minutes. The absorbance at 620 nm was 0.065 which translated to an efficiency of 37.1%.

EXAMPLE 5

Oil Dispersant Properties of Oat DDG

Oat DDG (Alcotech) was either extracted with hexane to remove the oil or was left intact. Both samples were processed in a Kitchen Mill to (–)120 U.S. mesh (125 $\mu$m). The standard protocol was followed using one liter of sea water adjusted to pH 8.02, 1.0 g NS crude oil and 0.2 g DDG. The hexane-extracted DDG gave an absorbance of 0.068 at 620 nm after 60 min, corresponding to an efficiency of 35.8%. The non-extracted DDG gave an absorbance at 620 nm of 0.088 at 60 min, corresponding to an efficiency of 46.8%.

EXAMPLE 6
Cleaning of Wildlife

Another application of the DDG and DDGS dispersants of the present invention is in the cleaning of oiled wildlife. As will be appreciated, with every oil spill, much of the oil is deposited on the beaches and on the animals and vegetation that surround the affected area. The particulate dispersants of the present invention will cleanse these objects.

To demonstrate this phenomenon, pheasant wings are dipped twice into 1600 ml of synthetic seawater in a 2 liter beaker through an oil layer containing 10 g of NS crude oil. Generally, the DDG or DDGS is spread on a wing, then gently wiped off to agglomerate and remove loose oil, then a second application is made and worked into the wing with tap water to sorb the remaining oil. Finally, the wing is rinsed off with lukewarm water.

The wings are air-dried, and their weights before and after oiling, as well as their weights after cleaning and drying, are compared. The DDG and DDGS-treated wings will result in the removal of a significant amount of oil.

EXAMPLE 7
Cleaning of Oiled Beaches

Beaches and shoreline rocks may be cleaned in a similar manner to the cleaning of animals. For example, through spreading the dispersants of the present invention on a beach, and scrubbing them into the sand and over the rocks, the dispersants will naturally sorb the oil. Thereafter, the beach front may be rinsed, or in the alternative, the natural wave action will carry the dispersant-associated oil out to sea. Advantageously, if the oil spill is pretreated with the dispersants of the present invention prior to being deposited on the shoreline, it will exhibit significantly less adhesion to beaches, rocks and other surfaces.

EXAMPLE 8
Remediation of Hydrocarbons in Soil by DDG

About 0.1 g of DDG is admixed with about 100 grams of moist soil containing about 1 g aliphatic hydrocarbons. A control experiment is also performed, using an identical soil sample to which no DDG has been added. The two soil samples are monitored for hydrocarbon breakdown over time by extraction with methylene chloride followed by gas chromatography analysis. The soil sample to which DDG has been added will show a more enhanced attenuation and/or elimination of hydrocarbon peaks on the GC chromatogram compared to the control soil sample, indicating the induction of bacterially-promoted hydrocarbon breakdown by the DDG.

While particular embodiments of the invention have been described in detail, it will be apparent to those skilled in the art that these embodiments are exemplary, rather than limiting, and the true scope of the invention is that defined in the following claims.

We claim:

1. A method for facilitating cleanup of environmental oil, comprising the step of applying DDG to said environmental oil and permitting said oil to become sorbed to said DDG.

2. The method of claim 1, wherein said oil is on a surface and said DDG is applied to said surface.

3. The method of claim 1, wherein said oil is floating on an open body of water.

4. The method of claim 3, wherein said oil is crude petroleum oil.

5. The method of claim 3, wherein said oil is a refined petroleum product.

6. The method of claim 3, wherein said DDG is in a floating, porous form.

7. The method of claim 3, further comprising the steps of permitting said DDG to sorb said oil and then dispersing said DDG carrying said sorbed oil in said water.

\* \* \* \* \*